United States Patent [19]
Dobbek et al.

[11] Patent Number: 6,034,831
[45] Date of Patent: Mar. 7, 2000

[54] DYNAMIC REVERSE REASSIGN APPARATUS AND METHOD FOR A DATA RECORDING DISK DRIVE

[75] Inventors: Jeffrey J. Dobbek; Mantle Man-Hon Yu, both of San Jose, Calif.

[73] Assignee: International Business Machines Corporation, Armonk, N.Y.

[21] Appl. No.: 08/853,978

[22] Filed: May 9, 1997

[51] Int. Cl.[7] .................................................. G11B 5/09
[52] U.S. Cl. ................ 360/53; 360/31; 360/47; 369/47; 369/58
[58] Field of Search ................. 369/47, 58; 360/31, 360/53, 47

[56] References Cited

U.S. PATENT DOCUMENTS

| | | | |
|---|---|---|---|
| 4,498,146 | 2/1985 | Martinez | 364/900 |
| 5,047,874 | 9/1991 | Yomtoubian | 360/25 |
| 5,202,876 | 4/1993 | Takagi et al. | 369/58 |
| 5,235,585 | 8/1993 | Bish et al. | 369/54 |
| 5,258,852 | 11/1993 | Kamijima | 358/335 |
| 5,303,219 | 4/1994 | Kulakowski et al. | 369/54 |
| 5,418,767 | 5/1995 | Gaudet et al. | 369/58 |
| 5,513,160 | 4/1996 | Satoh et al. | 369/47 |
| 5,526,335 | 6/1996 | Tamegai | 369/58 |
| 5,822,142 | 10/1998 | Hicken | 360/53 |
| 5,844,911 | 12/1998 | Schadegg et al. | 371/10.2 |

FOREIGN PATENT DOCUMENTS

| | | |
|---|---|---|
| 541219 | 5/1993 | European Pat. Off. . |

*Primary Examiner*—Aristotelis M. Psihs
*Assistant Examiner*—Dan I. Davidson
*Attorney, Agent, or Firm*—Ingrid M. Foerster; Randall J. Bluestone

[57] ABSTRACT

A data recording disk drive is provided with a reassignment architecture that employs both an "in-line" approach for small disk defects and an "off-site" reassignment for multiple-sector defects. As a further aspect of the invention, the defective sites that have been off-site reassigned are periodically reinspected to determine whether they in fact remain defective. If it is determined upon inspection that the defect is no longer present, the data in the off-site reassign area is returned to its original location, freeing spares for reuse. As a further aspect of the invention, reinspection is performed at disk drive spin-up or during idle periods.

58 Claims, 9 Drawing Sheets

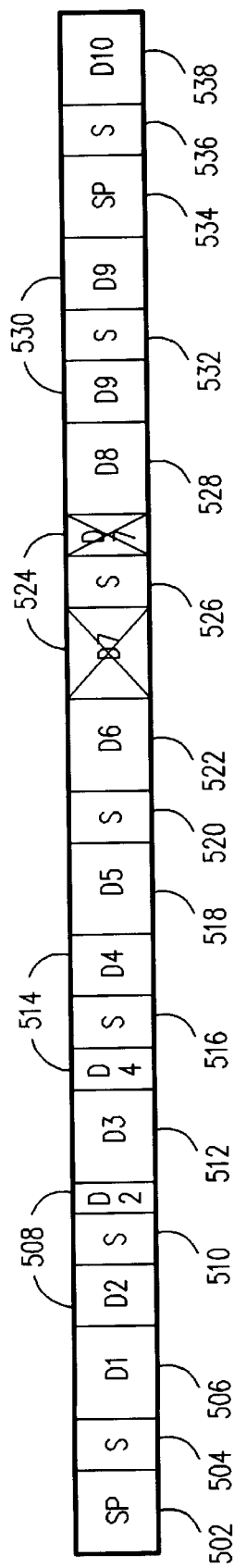
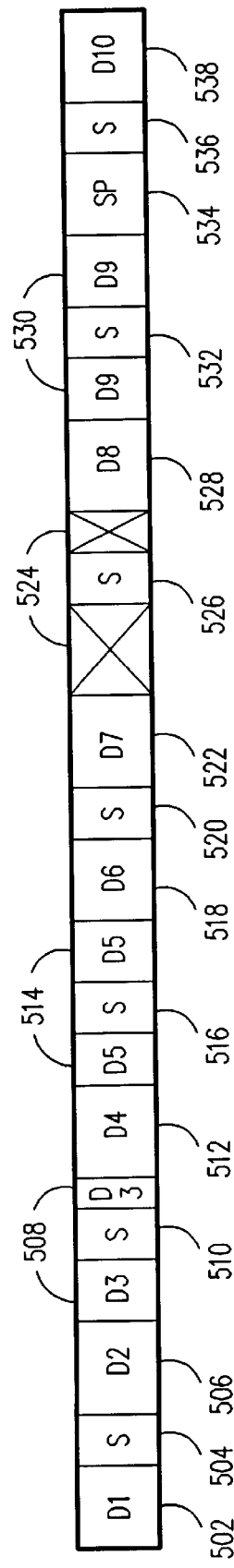
FIG. 5A
FIG. 5B

OFF-SITE REASSIGN

DYNAMIC REVERSE REASSIGN APPARATUS AND METHOD FOR A DATA RECORDING DISK DRIVE

FIELD OF THE INVENTION

This invention relates in general to data recording disk drives, and in particular to a data reassignment method and apparatus for use in such disk drives.

BACKGROUND OF THE INVENTION

Central to the magnetic disk drive is the use of a data recording disk having a magnetizable layer on its surface. Digital data is recorded on the disk in the form of magnetic transitions spaced closely together. In modern disk drives in particular, recording densities have reached a level which creates extreme sensitivity to imperfections known as media defects in the magnetic recording layer, resulting in portions of the layer becoming unacceptable for use in recording the magnetic transitions.

Defective regions of the disk are initially identified at manufacturing time during surface analysis testing (SAT). For disk drives employing data sector formats with ID fields, a defect flag is set in the ID field of each data sector to indicate whether it is defective, "good", or spare. A "P" defect list is created during SAT having an entry for each defective sector identified. The P list is used at manufacturing time as an input to a format operation. The format operation uses the P list to write defect information to the ID fields, or in the case of NoID disk drives, to generate a defect/spare table. Also included in the defect/spare table are entries for good sectors which have been designated as spares to be used during disk drive operation if additional good sectors become bad. A null reassign table is also generated at this time in disk drives implementing off-site reassigns (described subsequently). The ID fields or defect/spare tables are then used during read and write operations to skip over defective sectors and spare sectors. As additional defects occur on the disk surface, e.g., due to contact between the disk surface and the transducing head, a new list of "grown" defects (or "G" list) is created. Both the "P" and "G" lists are then used as inputs to format operations executed in the field to rewrite the ID fields or to generate a new defect/spare table. A specific method and apparatus for mapping defects in a NoID disk drive are disclosed in U.S. patent application Ser. No. 08/173,588 filed Dec. 23, 1993 and incorporated herein by reference.

New defects may be detected during either a read or write operation. When a read failure occurs, data stored in the defective region must be reconstructed and moved to a new location as part of an error recovery procedure. The error recovery procedure typically comprises microcode executed by the microcontroller.

The data is reassigned using either an off-site reassign operation or an in-line reassign operation. If the storage device implements off-site reassigns, data stored in the defective region will be reconstructed and written to one or more designated spare regions of the storage medium. The defect location and new data location are then entered into the reassign table, and defect is flagged by adding it to the G list and defect/spare table. On future attempts to read the track containing the defect, the control electronics consults the defect/spare table to identify the location of the defect. It also cross-references the reassign table to obtain the new location of the reassigned data. Reading continues up to the defective location, then is interrupted as the head seeks to the new data location to read the reassigned data. The head then returns to the track to continue reading information after the defect.

Unfortunately, the insertion of these extra steps into a read operation hampers the speed at which data can be retrieved from the disk. To improve performance, an "in-line" reassignment algorithm has been used. In-line reassign architectures in a NoID environment include a fixed number of spare sectors which are sprinkled throughout the drive. When a defective sector is identified, the following steps are executed: 1) the defect/spare table is consulted for the nearest available spare in each direction from the defect, and of those two spares, the one that is closest to the defect is selected; 2) upon identifying the closest spare, all data sectors between the defect and the spare are read to confirm that there are no newly grown defects therebetween; 3) if no defects are found, the procedure advances to step 6); 4) if a defect is found, the next nearest spare is selected, and all data sectors between the defect and identified spare are read to check for grown defects; 5) if defects are found, an error is posted and the reassign operation is aborted, or a "nested reassign" is performed until a suitable spare is found; 6) if a suitable spare has been identified, all data sectors between the defect and the spare are shifted by one sector in the direction of the spare; and 7) the defect/spare table and G list are updated. In this manner, the order of the data sectors is preserved during the reassign process. Consequently, it is no longer necessary to interrupt reading of defective data region by seeking to a new location to read the reassigned sector.

In-line reassignment thus provides an efficient method for handling disk defects, provided they are relatively small (e.g., affecting only one or two data sectors), since reassigns are only performed one data sector at a time.

Today's disk drives employ magnetoresistive heads which often interact with the surface of the disk to create thermal asperities. Thermal asperities can manifest themselves as large, multiple sector defects. An in-line approach to reassignment of data sectors corrupted by thermal asperities would be undesirably slow, requiring as many as 12–16 iterations of the reassign process and using up as many spares. In addition, temperature changes and head activity around a defective site can cause a thermal asperity to move. This, in turn, could cause a chain reaction of lengthy reassigns and depletion of spares.

It should be apparent, therefore, that there is a need for a reassign architecture which maintains the benefits of in-line reassignment when dealing with disk defects of small proportions, while providing an alternative and efficient method for dealing with multiple-sector defects. It would also be desirable to recapture spares used to reassign data from disk regions that are no longer defective, e.g., because of asperity movement.

SUMMARY OF THE INVENTION

In accordance with the invention, a data recording disk drive is provided with a reassignment architecture that employs both an "in-line" approach for small disk defects and an "off-site" reassignment for multiple-sector defects. As a further aspect of the invention, the defective sites that were off-site reassigned are periodically reinspected to determine whether they in fact remain defective. If it is determined upon inspection that the defect is no longer present, the data in the off-site reassign area is returned to its original location, freeing spares for reuse. As a further aspect of the invention, reinspection is performed at disk drive spin-up or during idle periods.

BRIEF DESCRIPTION OF THE DRAWINGS

FIGS. 5A and 5B are schematic representations of a portion of a data track having a defect, prior to and following in-line reassignment;

DETAILED DESCRIPTION

I. Sector Architecture

Figure 1:
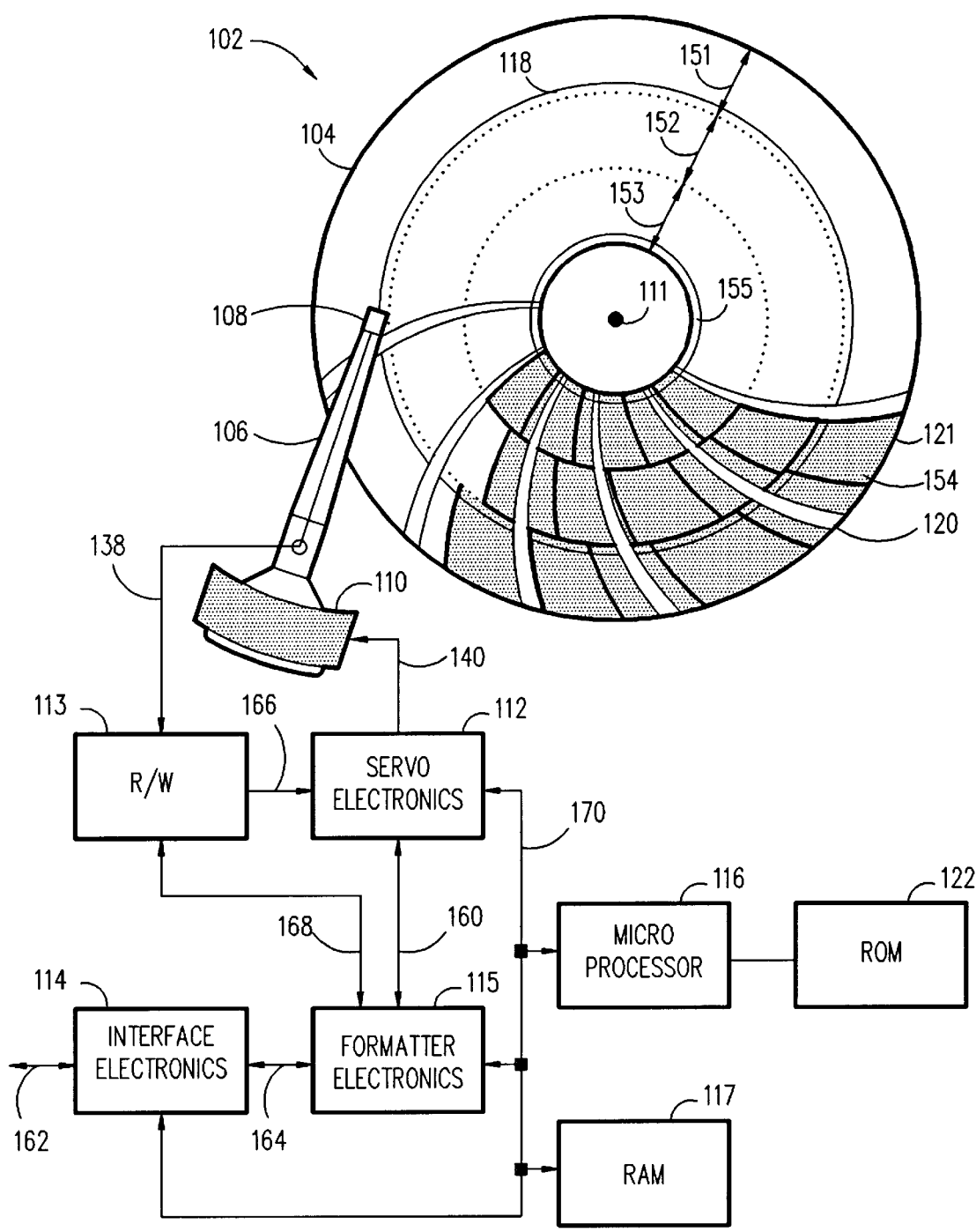
FIG. 1 is a schematic diagram illustrating a fixed block architecture disk drive in accordance with the present invention.

Shown in FIG. 1 is a disk drive configured in accordance with the present invention. The disk drive is formatted using a fixed block architecture with sector servo and zone-bit recording. The disk drive, designated generally as 102, includes data recording disk 104, actuator arm 106, data recording transducer 108 (also called a recording head), voice coil motor 110, servo electronics 112, read/write electronics 113, interface electronics 114, formatter electronics 115, microprocessor 116 and associated ROM 122, and RAM 117. The microprocessor 116 exercises control over the disk drive electronics by executing control microcode preferably stored in ROM 122 and on an area 155 of the disk 104 reserved for non-user data. During operation, the control microcode is loaded from ROM 122 and disk area 155 into temporary storage, such as RAM 117, for execution by the microprocessor 116. Data recording disk 104 also includes center of rotation 111, and is divided for head positioning purposes into a set of radially spaced tracks, one of which is shown at 118. The tracks are grouped radially into a number of zones, three of which are shown as 151, 152 and 153. Data is recorded at a different data rate in each zone to maximize bit density across the disk. The disk contains a plurality of servo sectors 120, which extend across the tracks in a generally radial direction. Each track has a reference index 121. Within each zone, the tracks are also circumferentially divided into a number of data sectors 154. Preferably, the data sectors contain no sector ID fields for increased data capacity. In accordance with the normal meaning of "fixed block architecture", all data sectors are substantially the same size, e.g., 512 bytes of data. However, it should be noted that the present invention may easily be adapted to variable length architectures. The number of data sectors per track varies from zone to zone. Consequently, some of the data sectors are split by servo sectors. If the disk drive has multiple heads, then the set of tracks which are at the same radius on all surfaces is referred to as a "cylinder".

Read/write electronics 113 receives signals from transducer 108, passes servo information to servo electronics 112, and passes data signals to formatter 115. Servo electronics 112 uses the servo information to produce a current at 140 which drives voice coil motor 110 to position recording transducer 108. Interface electronics 114 communicates with a host system (not shown) over interface 162, passing data and command information. Interface electronics 114 also communicates with formatter 115 over interface 164. Microprocessor 116 communicates with the various other electronics over interface 170.

In the operation of disk drive 102, interface electronics 114 receives a request for reading or writing data sectors over interface 162. Formatter electronics 115 receives a list of requested data sectors from interface electronics 114 in the form of logical block addresses and converts them into zone, cylinder, head and data sector numbers which uniquely identify the location of the desired data sectors, as will be described subsequently. The head and cylinder information are passed to servo electronics 112, which is responsible for positioning recording head 108 over the appropriate data sector on the appropriate cylinder. If the cylinder number provided to servo electronics 112 is not the same as the track number over which recording head 108 is presently positioned, servo electronics 112 first executes a seek operation in order to reposition recording head 108 over the appropriate cylinder.

Once servo electronics 112 has positioned recording head 108 over the appropriate cylinder, the desired data sectors are located by reading their ID fields. Alternatively, in a disk drive employing a headerless or NoID(TM) architecture, the servo electronics 112 begins executing sector computations in order to locate and identify the desired data sector, as described in U.S. patent application Ser. No. 07/727,680 is used to identify each servo sector, which is incorporated herein by reference. Briefly, a starting data sector is identified by its offset from the index mark. Since the track format is presumably known, the number of data sectors passed since index is determined from the servo sector count, and a precise offset into the appropriate data region may be determined.

For any given data recording disk drive, there is a fixed number of servo sectors per track, N, throughout the disk. Also, for each zone there is a fixed number of data sectors on each track, M. If M is not a multiple of N, then some of the data sectors will be split by servo sectors. The composition of the data sectors and servo sectors will vary with the particular disk drive design.

Figure 2:
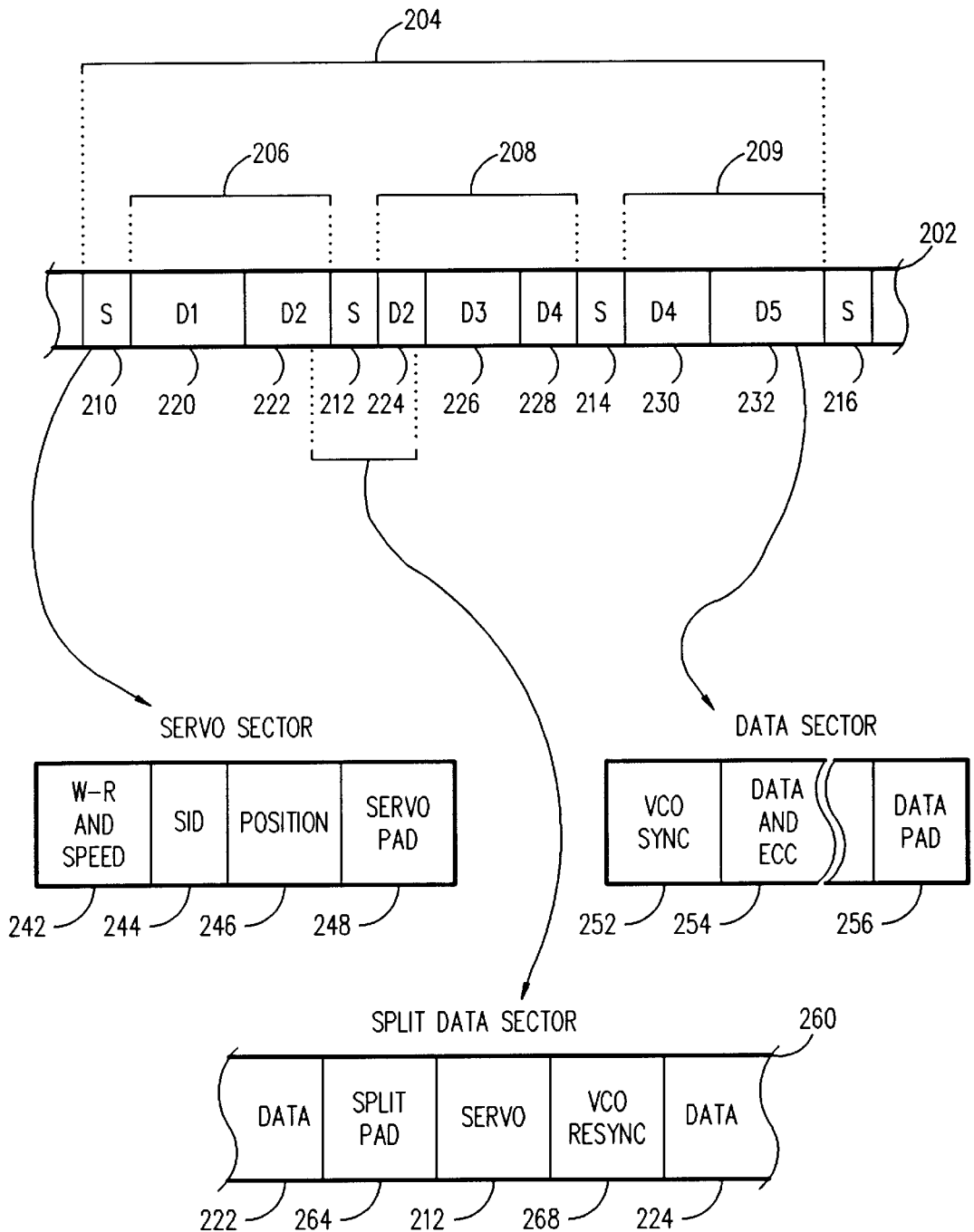
FIG. 2 is a schematic diagram illustrating a segment subdivision of a data recording track in accordance with the present invention.

A portion 202 of an exemplary track is shown in FIG. 2. The portion contains segment 204, a segment being defined as a set of servo sectors and data sectors having a unique spatial relationship between the sectors. The format for each track of a same zone may then be produced by repeating the segment. Segment 204 is subdivided into a plurality of data regions, 206, 208 and 209 interspersed with servo sectors 210, 212, and 214. Each data region contains a number of data sectors, D1–D5, some of which are be split by servo sectors. For example, region 206 contains the entire data sector D1 (section 220), and only a portion of data sector D2 (section 222).

An exemplary composition of a servo sector 210 includes write-to-read recovery and speed compensation field 242 for allowing the read/write electronics to switch from a data writing operation to a servo reading operation, and to allow for fluctuations in the disk rotational speed. Sector identifier field 244 precisely identifies a specific position within the servo sector which is used as a timing reference. Position field 246 contains the actual servo information used to position the head, typically including a position error signal (PES) and other information such as a grey code or track identifier (TID), an index value, a servo sector number (or any portion thereof) and head number (or any portion thereof). Servo pad field 248 allows for the electronics to switch from reading servo to writing or reading data, as well as for disk rotational speed variations.

The preferred disk drive design for implementing the present invention has a NoID data format. Thus, the composition of an exemplary data sector 232 includes a VCO sync field 252 for allowing read/write electronics to phase lock to the data. Data and ECC field 254 contains the user data and error correction information useful in detecting read errors and reconstructing defective data. Data pad field 256 allows for differences in processing time for reading and writing data, as well as for flushing any encoder/decoder, and for disk rotational speed variations. it also provides sufficient time for the electronics to prepare for operating on the following servo or data sector. Two additional fields are typically required when a data sector is split by a servo sector D2 260: split pad 264 and a VCO resync 268. Following a first portion 222 of the split sector 260, a split pad field 264 allows for the electronics to interrupt the reading or writing of data in a manner well known in the art. Servo sector 212 is followed by VCO resync field 268, which is used to restore the system to read remaining sector portion 224.

II. Defect Handling

In a typical magnetic storage disk, some tracks will include defective regions unfit for data storage. The defects can occur during manufacturing or assembly of the disk drive, or during normal disk operation. Particularly large defective regions may result from disk interaction with MR heads, as previously noted. A disk drive must be able to identify disk defects and keep track of known defects to avoid writing information to these regions. The mechanism used for tracking small defects in a NoID disk drive is the creation of a primary or "P" list during manufacturing surface testing, and a grown or "G" list during disk drive operation, both of which are preferably stored in the reserved area 155 of the disk. These lists are combined during reformat operations to create a defect/spare table which used in the LBA to PBA conversion process to skip over known defects and spares. The defect/spare includes information such as the logical address of the "skip" sector and type (defect or spare).

Subsequent defects are discovered during both read and write operations. During read operations, defects are detected when the disk drive electronics is unable to read data from a particular region of the disk. During both read and write operations, defects may be detected when reading the servo sectors between the data fields and failing to detect the servo sector identifying mark (SID). This type of error results in the inability to read or write to the entire data region following the servo sector. Defects may also be discovered during a write/verify operation—a specific type of write operation in which data is written to the disk and then immediately read to verify that it has been written correctly.

When any of the preceding events occurs, an error recovery procedure is initiated. As a first step of the error recovery, a predefined number of attempts are made to reread the defective region. If the problematic region is still unreadable after these reread attempts, further data recovery steps are executed. First, if the defect was discovered during a read operation, a data reconstruction operation may be executed in an attempt to reconstruct the data according to conventional error correction techniques. If so, a reassign operation is then executed to move the reconstructed data to a nondefective location on the disk. Reconstruction and reassignment are normally not necessary if the defect is discovered during writing, since the unreadable data is still be present in the write buffer. In a next step, the "grown" defect is recorded in the defect/spare table and in the G list. In addition, if data has been assigned according to an off-site reassign procedure, the newly assigned data location is entered into a reassign table which is used in subsequent read attempts of the defective region.

As noted above, disk drive performance during reading and writing is improved by implementing an "in-line" reassign procedure for relatively small disk defects, since the defective information is reassigned to an adjacent location such that its sequence relative to related data sectors is preserved. An in-line reassign procedure is well-suited for handling relatively small disk defects, since in-line reassigns only reassign one defective sector at a time. The definition of "relatively small" depends upon the number of iterations of the reassign procedure that can be executed before error recovery time becomes unacceptably lengthy. In any event, the larger the defective region, the more undesirable an in-line approach becomes. Unfortunately, the relatively recent introduction of MR heads into disk drive designs has given rise to a new class of multiple-sector disk defects called thermal asperities resulting from interaction between the heads and the disk surfaces. Moreover, a single thermal asperity can corrupt one or more servo SID's, making multiple data fields unreadable.

Accordingly, a first embodiment of the present invention contemplates a dual error recovery system wherein small disk defects—defects not exceeding a selected threshold size—are reassigned according to an in-line reassign procedure, whereas defects exceeding the threshold are reassigned by an off-site procedure. The threshold size is preferably one data sector, although the invention may be implemented using any alternative threshold value. The dual error recovery system preferably comprises part of the error recovery microcode stored in ROM 122 and/or on reserved disk area 155, and executed by microprocessor 116 (see FIG. 1), although it will be understood that alternative implementations partly or entirely incorporating hardware are also contemplated. The microcode may be stored any of on a variety of alternative computer-readable mediums such as floppy diskettes, removable and stationary optical or magnetic rigid disks, ROM, flash RAM, and magnetic tape, for example.

Figure 3:
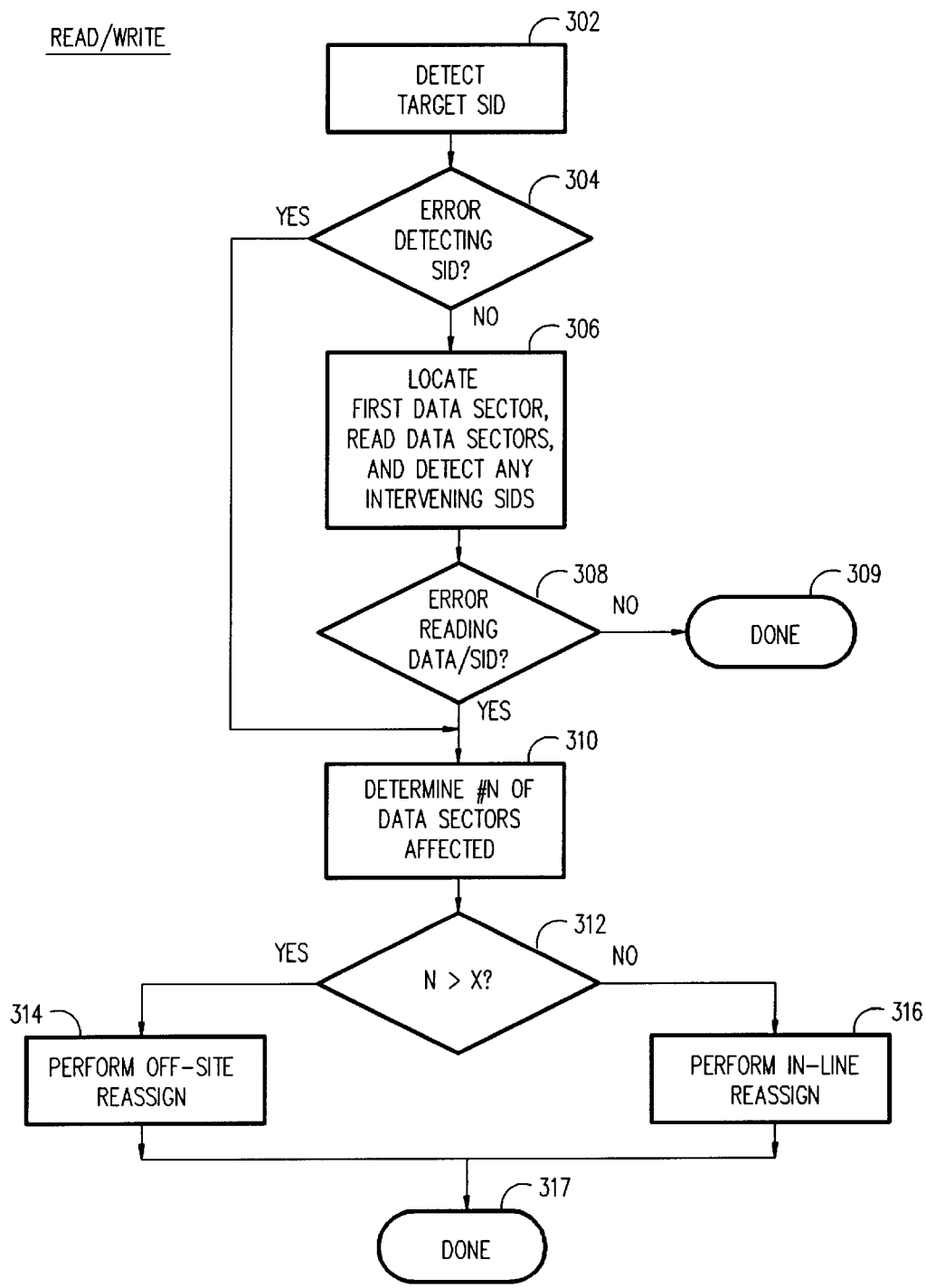
FIG. 3 is a flow diagram illustrating a dual defect management system according to the present invention.

The steps of the preferred dual error recovery system are illustrated in the flow diagram of FIG. 3. It shall be assumed that the servo electronics 112 has just completed a seek to a target data track specified in the read or write command. The MR head 108 is positioned over the target track reading servo information and providing a stream of track information to the servo electronics 112. Concurrently, the servo electronics 112 is attempting to identify the target SID in the incoming data stream by counting SIDs from index and comparing the count to the target SID number. This is shown as a first step 302 of FIG. 3. if the target SID is not identified, as represented by decision block 304, an error recovery procedure is initiated in the servo microcode. As a first step of the error recovery procedure, it is desirable but not necessary to first make additional attempts to locate the target SID (not shown). If these retries are unsuccessful, the SID is deemed defective, an error is posted to the microprocessor 116, and servo microcode control branches to step 310.

If the SID is located, the process continues to step 306. Calculations are made to locate the first data sector to be written or read, and upon location of the first sector, reading or writing proceeds for the requested number of data sectors. Typically, the operation of reading or writing will cause the transducer 108 to cross over several servo sectors and possibly even several data tracks. Meanwhile, the transducer continues to read intervening servo sectors, and the servo electronics 112 continues to detect servo information from the transducer signal, including SIDs, to maintain alignment between the read/write head 108 and the current data track.

Throughout the read or write operation, two events can occur which invoke an error recovery procedure or "ERP", as represented by decision block 308: 1) inability to read one of the data sectors, or 2) inability to detect a SID, resulting in failure to read or write subsequent data sectors. The first event would occur during execution of read or write-verify microcode sequences, and the last would occur during execution of a servo microcode sequence. Thus each of these microcode procedures provides a conditional branch into ERP. If any of these events occurs, attempts are first made to reread the missing data sector(s) or SID(s) before proceeding further with the error recovery procedure. If neither of the preceding events occurs, or if any of the retries are successful, then the read or write-verify operation completes successfully as shown by step 309. Otherwise, the affected data regions or SIDs are determined to be defective and control branches to step 310.

In step 310, the size of the defective region is determined. In the case of unreadable data sectors, size is simply determined from a count of the number of adjacent data sectors that could not be read during the read or write-verify operation. In the case of a missing SID, defect size is determined from a knowledge of the track format. For example, referring to FIG. 2, it will be assumed that the servo electronics 112 was unable to read the SID of servo sector 210 after several attempts. From a knowledge of the format of segment 204 and the location of the SID within that segment, it is a simple matter to determine that the defect will affect reading of data sectors D1 and D2. In this particular example, the size of the defective region is determined to be two data sectors. If the thermal asperity is large and two adjacent SIDS are corrupted—sectors 210 and 212 of FIG. 2, for example—then data sectors D3 and D4 are also affected. The defective region in under these circumstances has a size of four data sectors.

Once defect size has been determined, the procedure advances to decision block 312, where the defect size is compared to a threshold value. The threshold value is determined as a matter of design choice based upon factors such as a cluster of defects around some value observed in a particular disk drive design, and the maximum number of defective data sectors that an in-line reassign can handle within specified performance parameters.

In the preferred disk drive embodiment, it was found that disk defects other than thermal asperities tended to cluster about an average size of one data sector or less. Consequently, a size of one data sector was selected as the threshold value. If the defect is below the selected threshold value, control advances to an in-line reassign procedure (step 316). Otherwise, an off-site reassign is scheduled (step 314). Once an appropriate reassign procedure has been executed, the ERP terminates at step 317 and control is returned to normal disk drive operations.

Figure 4:
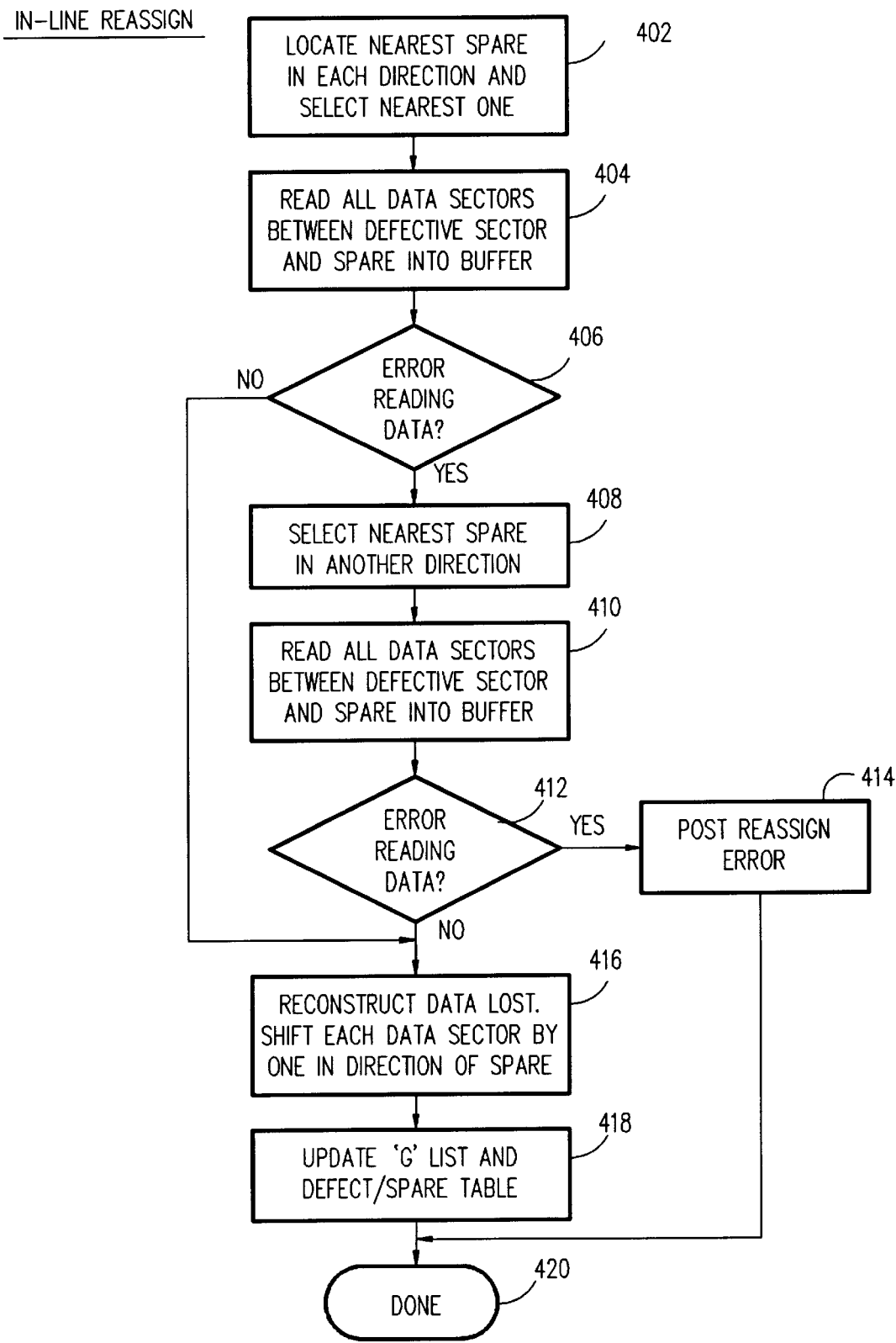
FIG. 4 is a flow diagram illustrating an in-line reassign procedure suitable for practicing the present invention.
Figure 6:
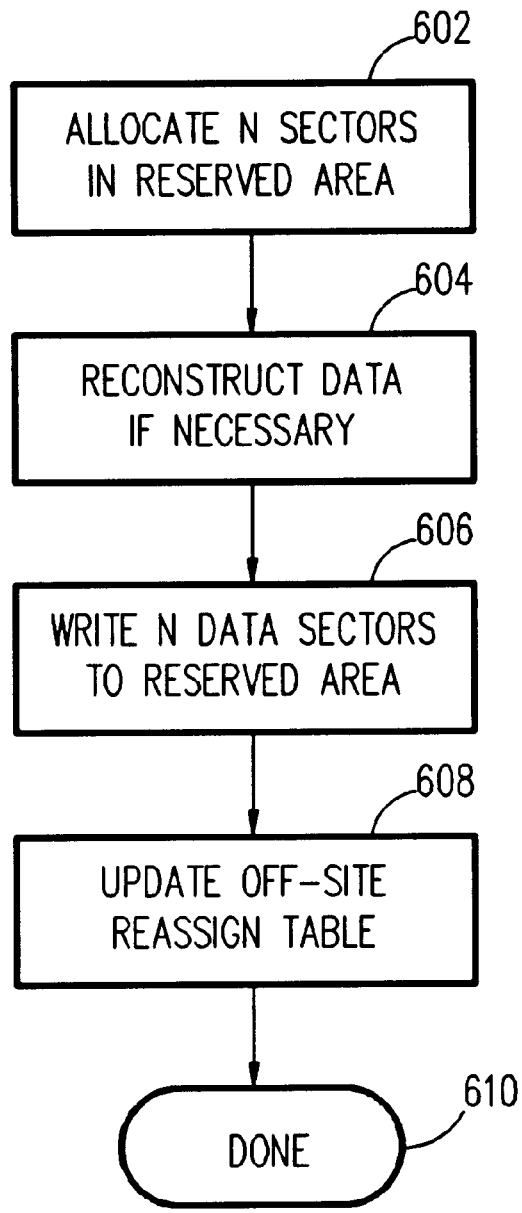
FIG. 6 is a flow diagram illustrating an off-site reassign method according to the present invention.

FIG. 4 is a flow diagram illustrating the preferred in-line reassign procedure to be executed for each defective data sector of the one or more defective sectors found to fall below the threshold value. It shall be understood, however, that alternative "local" reassign algorithms may be equally suitable for this aspect of the invention. The size of the defect must be determined as a condition of entry, as previously described.

To facilitate explanation, FIG. 5A illustrates a track portion having the same track format as was introduced in FIG. 2. The labels D1–D10 represent data stored in respective data sector and split data sector locations 506, 508, 512, 514, 518, 522, 524, 528, 530 and 538. The portion further includes two data sector locations 502 and 534 designated as spare sectors SP. Data sector D7 at split sector location 524 has been crossed out to represent a defect. In a first step 402, the closest spare sector in each direction from the defective sector 524 is identified, e.g., by consulting the defect map, and the one nearest to the defect is selected. Since spare sector 534 is nearer than sector 502, this sector is selected. The procedure then proceeds to step 404, and all of the data from the data sector locations between the defect and spare are read into a buffer such as RAM 117. That is, data sectors D8 and D9 from data sector locations 528 and 530 are read into the buffer. The purpose of this step is twofold: to determine whether any of the intervening data sector locations are defective, making the spare unsuitable for in-line reassignment (step 406); and to load data sectors D8 and D9 into the buffer 117 in preparation for the next step.

If no error occurs while reading the intervening data sectors, the procedure advances to step 416. For purposes of illustration, however, it will be assumed that an error occurred reading data sector D9 530. Under these circumstances, the procedure advances to step 408 and the nearest spare in the opposite direction is selected. In the present example, spare sector 502 is identified as the alternate spare. Next, data sectors between the defect and spare are again read into the buffer 117 to identify any problem sectors (step 408). That is, data sectors D1–D6 from data sector locations 506, 508, 512, 514, 518 and 522 are read. If an error occurs when reading these intervening sectors, the in-line reassign has failed and a reassign error is posted to the microprocessor (step 414).

Assuming no errors for the present example, the procedure advances to step 416. At this point, if the defective sector location contained data, the data must be reconstructed according to known methods. For example, since defective data sector location 524 included data sector D7, this data sector must be reconstructed. The reconstructed data and the buffered data are next reassigned to the data sector locations as shown in FIG. 5B, so that each data sector is offset by one data sector location in the direction of the spare sector location 502. In the present example, data sector D7 is reassigned to the data sector location 522 immediately adjacent to the defective data sector location 524, data sector D6 is reassigned to location 518, and so on. In this manner, the sequence of each data sector relative to the other data sectors of the track is preserved so that seeks to remote locations during reading of the reassigned data is avoided. In the final step 418, the defect/spare map is updated with the sector location 524 of the newly discovered defect so that future read or write operations will skip location 524 and will read location 502. The G list is also updated. The procedure then terminates in step 420, returning control to normal disk drive operations.

Figure 7:
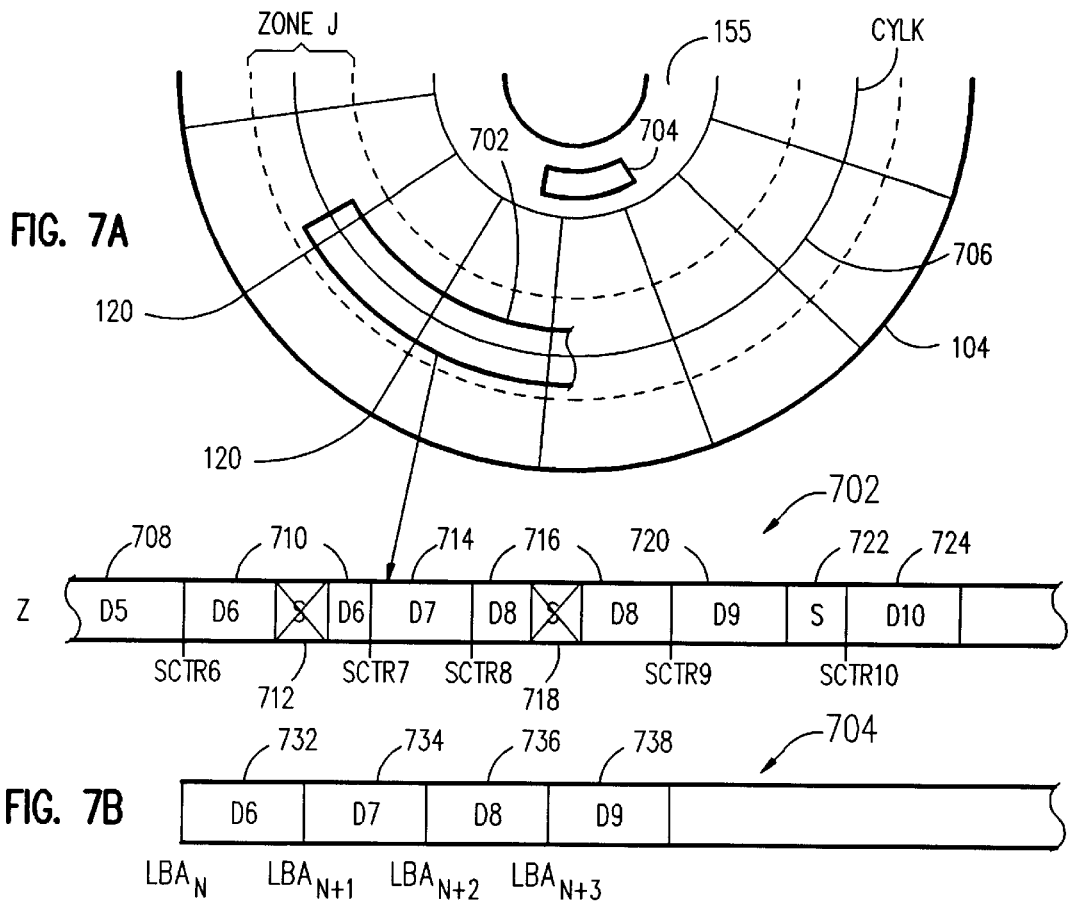
FIG. 7A is a schematic diagram illustrating a portion of a data storage disk highlighting a portion of a data track having a multiple-sector defect, and highlighting spare space in the reserved area of the disk allocated for use in the off-site reassign operation according to the present invention.
FIG. 7B is an enlarged view of the track portion of FIG. 7A prior to and after reassignment, and of the contents of the allocated spare space after reassignment.
FIG. 7C is a schematic diagram representing an exemplary off-site reassign defect table according to the present invention.

The off-site reassign procedure will now be described with reference to the flow diagram of FIG. 6 and FIGS. 7A–7C. FIG. 7A shows a portion of disk 104 including a track 706 and servo sectors 120. A portion 702 of the track 706 is shown in greater detail in FIG. 7B to include a plurality of servo sectors S at respective servo sector locations 712, 718, 722, and a plurality of data sectors D5–D10 stored in respective data sector locations 708, 710, 714, 716, 720 and 724. For purposes of illustration, servo sector locations 712 and 718 are crossed out to indicate that one or more thermal asperities have rendered the sector marks unreadable. The size of the defective region may be determined from a knowledge of the track format. For example, the inability to read servo sector location 712 renders data sectors D6, D7 and D8 unreadable and therefore defective. (Note that when a portion of a split data sector is unreadable, the entire sector is deemed defective.) Furthermore, since servo sector location 718 is unreadable, data sector D9 is also unreadable and thus defective. The entire defective region is determined to be four data sectors long, exceeding the threshold of one data sector and invoking the off-site reassign procedure.

In a first step 602 of the procedure, a portion 704 of spare space is allocated in the reserved area 155 of the disk 104 for performing the off-site reassign. The spare space reserved for off-site reassign operations is preferably recorded in a list separate from the "G" list so that it is not incorporated into the defect map. Allocation involves checking the list to determine whether a sufficient number of spares are available (preferably consecutive), and if so, then proceeding with the operation. In the present example, data sectors D6–D9 must be reassigned. Thus the off-site spare list will be checked for four available spare sectors in the spare region 704, and if four are found to be available, these will be allocated for off-site reassignment. Although it is preferable for performance reasons to use consecutive spare sectors for reassignment, this is not a requirement of the invention. Moreover, the spares do not have to be located on the reserved area of the disk, or even on the same disk surface as the defective region.

If the defective SIDs are detected during a write operation, data sectors D6–D9 may still be present in the write data buffer in RAM 117 for reassignment to a new off-site location. However, if the defects are discovered during a read operation, the data sectors must be reconstructed according to previously known methods, as represented in step 604. Next, the defective sectors are reassigned from their original data sector locations to the allocated off-site location 704. For example, data sectors D6–D9 are shown reassigned to section 704 in FIG. 7B.

In a final step 608, a hierarchical off-site reassign table is updated with the defect information. An exemplary defect table is represented in FIG. 7C. Defect information entered into the table preferably includes the physical starting address of the defect in terms of a zone, cylinder, head and sector number, i.e., the first defective data sector to be encountered by the read head 108. To illustrate, the reassigned track portion 702 shown in FIG. 7B is identifiable by the physical address $Z_J C_K H_L$, representing the Jth data zone of the disk stack, the Kth cylinder within that zone, and the data surface corresponding to the Lth head of the head stack. Data sector locations of the track portion 702, which are identified by a sector offset from the index mark, are labeled sctr6–sctr10. Since the first affected data sector (or portion thereof) of our example begins at sctr6, address $Z_J C_K H_L S_6$ is entered into the table after any entries having a lower physical address, but prior to any entries having a higher address. The length of the defect, i.e., four data sectors, is also entered, as is the logical starting address $LBA_N$ of the reassign location. It shall be understood that the format of the off-site reassign table may be arranged in any equivalent fashion, including logical mapping. Like the defect map, table 730 is accessed prior to every new track read or write operation to determine whether any requested data sector locations have been reassigned to an off-site location.

III. Restoring Temporarily Defective Regions

Figure 8:
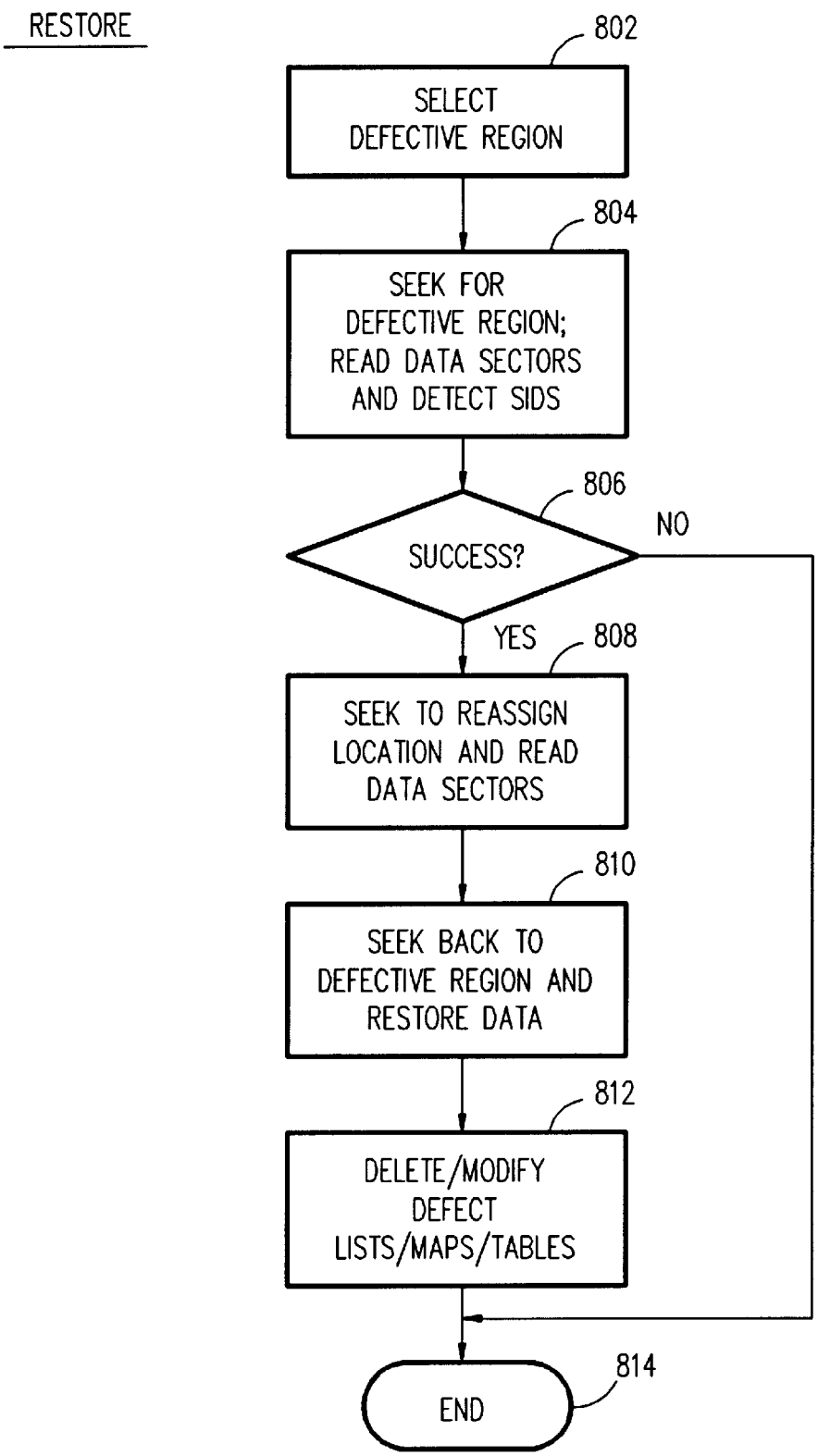
FIG. 8 is a flow diagram illustrating a defect restoring procedure according to the present invention.

Defects attributable to thermal asperities can be many data sectors in length, recovery from these types of defects consumes a large portion of spare space. Since thermal asperities can sometimes change position over time, the present invention proposes to recheck defects from time to time to determine whether they remain defective. If the rechecked regions are no longer defective, the reassigned data can be returned to its original location, freeing up remote spares for other reassign operations. Thus a further aspect of the invention is illustrated in the flow diagram of FIG. 8. The flow diagram depicts a procedure for restoring previously reassigned data sectors. Preferably, this restore procedure is implemented in microcode, stored in ROM 122, as part of the power up sequence of the disk drive.

In a first step 802 of the procedure, a previously reassigned defective region is selected for checking to determine whether or not it remains defective. Checking may be performed on all known disk defects, regardless of size, so that selection is performed by consulting all existing defect maps and tables. In the preferred embodiment, this would mean that both the defect map and the off-site reassign table are consulted. Alternatively, and according to the preferred embodiment, checking is performed exclusively for large defects, e.g., only for multiple sector defects likely to be attributable to thermal asperities. In this embodiment, all defects are selected sequentially from the off-site reassign table. Checking is performed in the next step 804 by reading the temporary copies of the sectors at the address found in the table and executing a seek to the selected region and attempting to read or write all of its data sectors. At step 806, if any portion of the region is still unreadable (including intervening SIDs), then the restore procedure terminates. But if the region is determined to be free from defects, the procedure advances to step 808. In step 808, the defect table entry is consulted for the location of the data sectors reassigned from the defective region. A seek is executed to the reassign location, and the reassigned data sectors are read into the data buffer. Next (step 810), the actuator seeks back to the defective region and the data sectors are written back to their original, and now nondefective data sector locations. If successful, in a final step, updates are made to the off-site reassign table, the defect/spares table, and the G list to remove the defect entries and designate the freed spares as available. The process then terminates (step 814).

If spare space is greatly limited, it may be desirable to modify the described procedure described above. Specifically, if any consecutive sectors of the defect being checked have become readable (steps 804), that portion may be restored and the corresponding table entry updated to reflect the reduced defect size. According to this alternative embodiment, at least a portion of the off-site spares would be freed for subsequent use.

Although the restore procedure of the present invention is preferably executed when the disk drive is powered up, it may alternatively or additionally be scheduled to occur at other times, e.g., during idle times when data access operations are not in progress, or at the special request of a user.

It shall be understood that the restore procedure is not intended to be limited to the dual reassign architecture of the present invention, since it is equally suitable to disk drives exclusively employing off-site reassigns or in-line reassigns. However, it will be appreciated that the procedure is particularly useful for rechecking relatively large defective regions.

IV. Formatter and Servo Electronics

Figure 9:
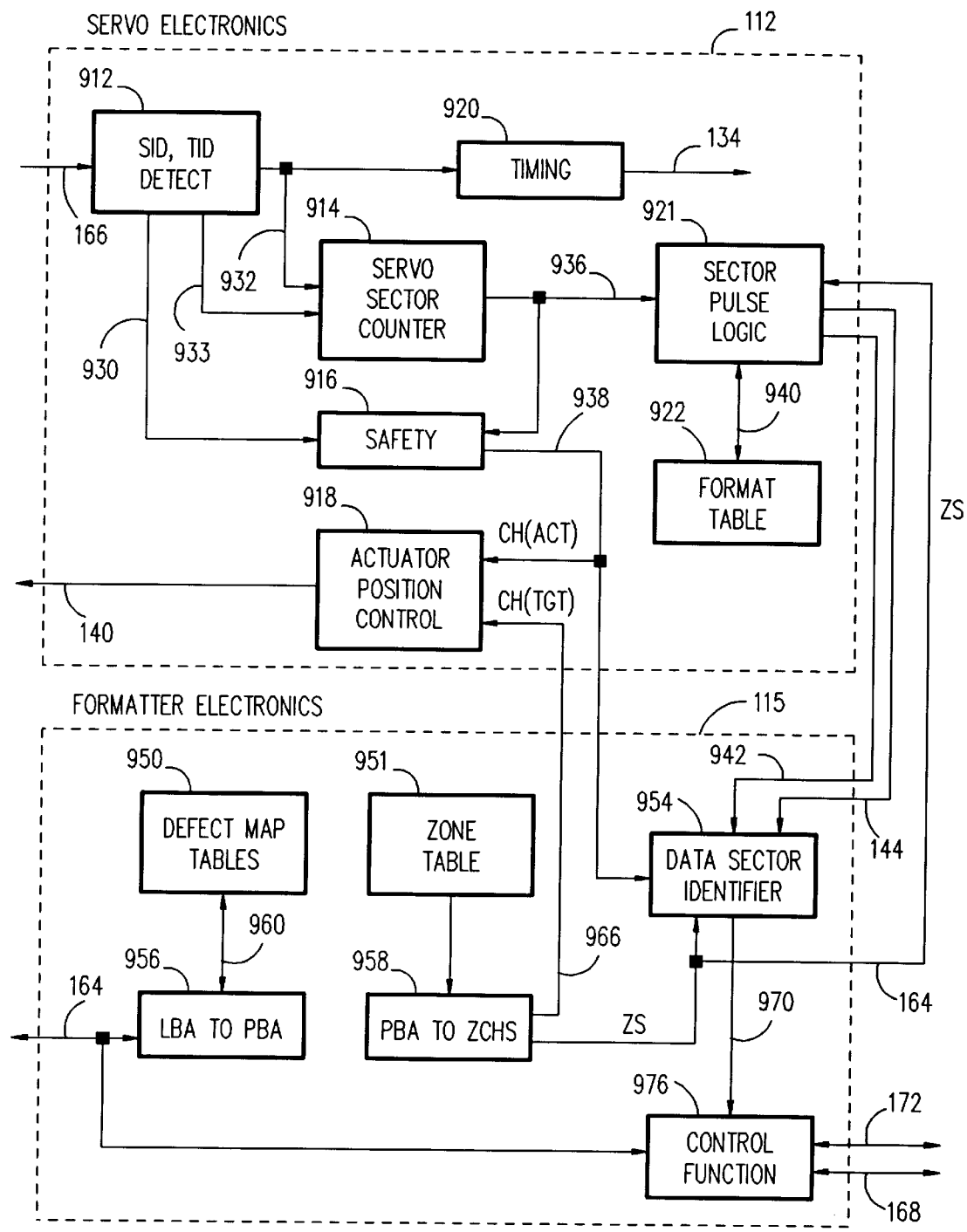
FIG. 9 is a block diagram detailing the servo and formatter electronics of FIG. 1.

FIG. 9 is a schematic diagram of the preferred embodiment of the servo and formatter electronics used to locate and identify data sectors according to the present invention. The operation of the electronics is described fully in the previously cited U.S. Patent Application, but will be briefly summarized below. Servo electronics 112 includes sector identifier (SID) detector and track number (TID) decoder 912, servo sector counter 914, safety logic 916, actuator position control logic 918, timing generation logic 920, sector pulse generation logic 921 and format table 922. Formatter electronics 115 includes the defect map and off-site reassign table, represented by function block 950, data sector identifier 954, logical block address (LBA) to physical block address (PBA) converter 956, PBA to zone, cylinder, head and data sector (ZCHS) converter 958, zone table 951, and control function 976.

In operation, formatter 112 receives a request for a read or write operation on a list of data sectors 164. The sectors are identified by their LBAs. The LBA list is converted to a PBA list by converter 956 using defect information 950, assuring that the defects are skipped over during read and write operations. The PBA list 968 is converted to a list of physical ZCHS using zone information 951. The cylinder and head values 966 (C and H) are passed to actuator position control logic 918 to affect a seek. Actuator position control logic 918 functions in a manner known in the art. Zone and sector values 964 (Z and S) are passed to data sector identifier 954 and to servo electronics 112. Additionally, servo electronics 112 receives servo information 166 from the read/write electronics. SID detector 912 detects the servo identifying mark, and signals that the SID has been found at 932. This signal or sector pulse is passed to timing logic 920, which generates the timing signals necessary for operation of servo electronics 112. It is also passed to servo sector counter 914. In addition, SID detector 912 decodes the track identifying (TID) information, including cylinder (track) number, servo index, servo sector number and head number. Index signal 933 is used to reset servo sector counter 914, and the counter is incremented by the servo pulse 932 at each subsequent servo. In this manner, the servo sector counter will always output the current servo sector number at 936. Safety logic 916 receives decoded TID information 930, and servo sector number 936. This logic performs various safety tests to ensure the proper operation of the servo electronics. Its functions include comparing the generated servo sector number 936 with any servo sector number information in the TID (including index) and processing any error handling information in the TID. Error information, along with the cylinder and head number, are output at 938. Actuator position control 918 compares the cylinder and head values 938 with the target values 966, and acts upon any errors. Sector pulse logic 921 uses servo sector number 936 to generate the address for format table 922, retrieving segment information 940 for the zone. Sector pulse logic 921 also contains three counters: a sync counter, a data counter, and a pad counter. Each of these counters is used to count byte clocks during the various fields in the format, whereby the data sectors are located and identified. Sector pulse logic 921 is thereby able to identify both the starting location and the data sector number of the data sector about to pass under recording head 108. The current data sector number 942 is sent to formatter electronics 115, and a start of data sector pulse 944 is sent when the start of a data sector is under the head, enabling the formatter to perform functions with zero latency. Upon receipt of data sector pulse 944, data sector identifier 954 compares the current data sector number 942 to the list of ZCHS values 964. If a match is found, this information is passed via 970 to control function logic 976, at which point the data sector is further processed in accordance with methods known in the prior art.

With reference to the fields described above, it is to be noted that many alternative configurations exist which would accomplish the same purpose. For instance, the LBA may be replaced with any logical identifier, while the ZCHS may be replaced with any value or combination of values identifying a unique sector number.

While the invention has been particularly described and illustrated with reference to a preferred embodiment, it will be understood by those skilled in the art that changes in the description and illustrations may be made with respect to form and detail without departing from the spirit and scope of the invention. Accordingly, the present invention is to be considered as encompassing all modifications and variations coming within the scope defined by the following claims.

We claim:

1. A defect handling system for use in a disk drive having a data storage disk formatted with a plurality of tracks, and a transducer assembly that is positionable relative to the disk for reading and writing data thereon, the system comprising:

a defect detection system which receives information from the transducer, identifies therefrom a defective region of the disk in a first track and determines the size of the defective region;

a first data reassign system which reassigns any data previously written, or scheduled to be written, to the defective region to a substantially adjacent nondefective area of the first track, if the size of the defective region does not exceed a threshold size; and a second reassign system which, when selected, reassigns any data previously written, or scheduled to be written, to the defective region to a remote nondefective area outside the first track if the size of the defective region exceeds a threshold size.

2. The system of claim 1, further comprising a defect table maintained by the first and second reassign systems for use in subsequent reading or writing at the defective region.

3. The system of claim 2, further comprising a reassign table maintained by the second reassign system for use in subsequent reading or writing at the defective region.

4. The system of claim 2, wherein data is further subdivided into data sectors, and wherein the defect table includes an entry for each defective data sector.

5. The system of claim 1, further comprising a first defect table maintained by the first reassign system and a second defect table maintained by the second reassign system, both for use in subsequent reading or writing at the defective region.

6. The system of claim 5, wherein the data is further subdivided into data sectors, wherein the first table includes one entry for each defective sector reassigned by the first reassign system, and wherein the second table includes one entry for each defective region reassigned by the second reassign system.

7. The system of claim 1, wherein the first reassign system further comprises:

means for locating a nearest nondefective spare area in either direction from the defective region;

means for reading all data located between the defective region and the nondefective spare area into a data buffer;

means for rewriting the data previously written, or scheduled to be written, to the defective region and the buffered data to an area between the defective region and the nondefective spare area that includes the nondefective spare area, such that the original sequence of the rewritten data is preserved.

8. The system of claim 7, further comprising means for reconstructing data previously written to a defective area.

9. The system of claim 7, further comprising:
means for detecting read errors when reading the data between the defective region and the nearest nondefective spare area,
means for locating a next nearest nondefective spare area in the opposite direction from the nearest nondefective spare area, relative to the defective region, if the detecting means has detected a read error,
means for reading all data located between the defective region and the next-nearest nondefective spare area into the data buffer,
means for rewriting the data previously written, or scheduled to be written, to the defective region and the buffered data to an area between the defective region and the next-nearest nondefective spare area and including the next-nearest nondefective spare area, such that the original sequence of the rewritten data is preserved.

10. The system of claim 1, wherein nondefective areas used by the second reassign system are located in an area of the disk reserved for use by the disk drive.

11. The system of claim 1, wherein the threshold size is one data sector.

12. The system of claim 1, further comprising,
a defect checking system which reads a region of the disk previously identified as defective and reassigned by the second reassign system to determine if the region is still defective; and
a reverse reassign system for moving data previously reassigned from the region back to the region if the defect checking system has determined that the region is no longer defective, thus freeing the nondefective area for use.

13. The system of claim 12, wherein defective regions are checked during an initialization sequence of the disk drive or during periods when the disk drive is not performing normal reading or writing operations.

14. The system of claim 12, wherein the defect detection system maintains at least one defect table having an entry for each defective region identified for use in subsequent reading of reassigned data, and wherein if a defective region has been determined to no longer be defective, the entry corresponding to that defective region is removed from the table.

15. The system of claim 14, wherein defects are checked at predetermined times by sequentially checking the defective regions entered in the defect table.

16. The system of claim 12, wherein the first reassign system maintains a first defect table having an entry for each defective region not exceeding the threshold size, and wherein the second reassign system maintains a second defect table having an entry for each defective region exceeding the threshold size, both tables for use in subsequent reading of reassigned data, and wherein if a defective region has been determined to no longer be defective, the entry corresponding to that defective region is removed from the table.

17. The system of claim 12, wherein the checking system checks each defective region a fixed number of times, thereafter designating the defective region irreversible.

18. The system of claim 1, wherein the data storage disk comprises a plurality of servo sectors, and wherein the identified defective region comprises a data region following an unreadable servo sector.

19. A defect handling system for use in a disk drive having a data storage disk formatted with a plurality of tracks, and a transducer assembly that is positionable relative to the disk for reading and writing data thereon, the system comprising:
a defect detection system which receives information from the transducer, identifies therefrom a defective region of the disk in a first track and determines the size of the defective region;
a first data reassign system which reassigns any data previously written, or scheduled to be written, to the defective region to a substantially adjacent nondefective area of the first track, if the size of the defective region does not exceed a threshold size; and
a second reassign system which, when selected, reassigns any data previously written, or scheduled to be written, to the defective region to a remote nondefective area outside the first track if the size of the defective region exceeds a threshold size;
a defect checking system which reads a region of the disk previously identified as defective and reassigned by the second reassign system to determine if the region is still defective, wherein the defect checking system only checks defective disk regions exceeding the threshold size; and
a reverse reassign system for moving data previously reassigned from the region back to the region if the defect checking system has determined that the region is no longer defective, thus freeing the nondefective area for use.

20. An article of manufacture for use in a defect handling system for use in a disk drive having a data storage disk formatted with a plurality of tracks, and a read/write circuit including a transducer that is positionable relative to the disk for reading and writing data thereon, the article of manufacture comprising computer readable storage media including a plurality of program logic instructions embedded therein that causes control circuitry to perform the steps of:
detecting, from information provided by the read/write circuit, a defective region of the disk in a first track;
determining, from information provided by the transducer, whether the defective region exceeds a threshold size;
causing data previously written, or scheduled to be written, to the defective region to be reassigned to a substantially adjacent nondefective region of the first track, if the length of the defect does not exceed the threshold size; and
causing data previously written, or scheduled to be written, to the defective region to be reassigned to a remote nondefective region outside the first track if the length of the defect exceeds the threshold size.

21. A disk drive, comprising:
a data storage disk formatted with a plurality of tracks;
a transducer assembly that is positionable relative to the disk for reading and writing data thereon; and
a defect handling system, comprising,
a defect detection system which receives information from the transducer, identifies therefrom a defective region of the disk in a first track and determines the size of the defective region;
a first data reassign system which reassigns any data previously written, or scheduled to be written, to the defective region to a substantially adjacent nondefective area of the first track, if the size of the defective region does not exceed a threshold size; and a second reassign system which, when selected, reassigns any data previously written, or scheduled to be written, to the defective region to a remote nondefective area outside the first track if the size of the defective region exceeds the threshold size.

22. The disk drive of claim 1, further comprising a defect table maintained by the first and second reassign systems for use in subsequent reading or writing at the defective region.

23. The disk drive of claim 22, wherein data is further subdivided into data sectors, and wherein the defect table includes an entry for each defective data sector.

24. The disk drive of claim 21, further comprising a first defect table maintained by the first reassign system and a second defect table maintained by the second reassign system, both for use in subsequent reading or writing at the defective region.

25. The disk drive of claim 24, wherein the data is further subdivided into data sectors, wherein the first table includes one entry for each defective sector reassigned by the first reassign system, and wherein the second table includes one entry for each defective region reassigned by the second reassign system.

26. The disk drive of claim 21, wherein the first reassign system further comprises:

means for locating a nearest nondefective spare area in either direction from the defective region;

means for reading all data located between the defective region and the nondefective spare area into a data buffer;

means for rewriting the data previously written, or scheduled to be written, to the defective region and the buffered data to an area between the defective region and the nondefective spare area and including the nondefective spare area, such that the original sequence of the rewritten data is preserved.

27. The disk drive of claim 26, further comprising means for reconstructing data previously written to a defective area.

28. The disk drive of claim 26, further comprising:

means for detecting read errors when reading the data between the defective region and the nearest nondefective spare area, means for locating a next nearest nondefective spare area in the opposite direction from the nearest nondefective spare area, relative to the defective region, if the detecting means has detected a read error, means for reading all data located between the defective region and the next-nearest nondefective spare area into the data buffer, means for rewriting the data previously written, or scheduled to be written, to the defective region and the buffered data to an area between the defective region and the next-nearest nondefective spare area and including the next-nearest nondefective spare area, such that the original sequence of the rewritten data is preserved.

29. The disk drive of claim 21, wherein the sequence of the reassign data relative to adjacent data is preserved after reassignment.

30. The disk drive of claim 21, wherein nondefective areas used by the second reassign system are located in an area of the disk reserved for use by the disk drive.

31. The disk drive of claim 21, wherein the threshold size is one data sector.

32. The disk drive of claim 21, further comprising, a defect checking system which reads a region of the disk previously identified as defective and reassigned by the second reassign system to determine if the region is still defective; and a reverse reassign system for moving data previously reassigned from the region back to the region if the defect checking system has determined that the region is no longer defective, thus freeing the nondefective area for use.

33. The disk drive of claim 32, wherein defective regions are checked during an initialization sequence of the disk drive or during periods when the disk drive is not performing normal reading or writing operations.

34. The disk drive of claim 32, wherein the defect detection system maintains at least one defect table having an entry for each defective region identified for use in subsequent reading of reassigned data, and wherein if a defective region has been determined to no longer be defective, the entry corresponding to that defective region is removed from the table entry.

35. The disk drive of claim 34, wherein defects are checked at predetermined times by sequentially checking the defective regions entered in the defect table.

36. The disk drive of claim 32, wherein the first reassign system maintains a first defect table having an entry for each defective region not exceeding the threshold size, and wherein the second reassign system maintains a second defect table having an entry for each defective region exceeding the threshold size, both tables for use in subsequent reading of reassigned data, and wherein if a defective region has been determined to no longer be defective, the entry corresponding to that defective region is removed from the table entry.

37. The disk drive of claim 32, wherein the checking system checks each defective region a fixed number of times, thereafter designating the defective region irreversible.

38. The disk drive of claim 21, wherein the data storage disk comprises a plurality of servo sectors, and wherein the identified defective region comprises a data region following an unreadable servo sector.

39. A disk drive, comprising:

a data storage disk formatted with a plurality of tracks;

a transducer assembly that is positionable relative to the disk for reading and writing data thereon; and a defect handling system, comprising, a defect detection system which receives information from the transducer, identifies therefrom a defective region of the disk in a first track and determines the size of the defective region;

a first data reassign system which reassigns any data previously written, or scheduled to be written, to the defective region to a substantially adjacent nondefective area of the first track, if the size of the defective region does not exceed a threshold size; and a second reassign system which, when selected, reassigns any data previously written, or scheduled to be written, to the defective region to a remote nondefective area outside the first track if the size of the defective region exceeds the threshold size;

a defect checking system which reads a region of the disk previously identified as defective and reassigned by the second reassign system to determine if the region is still defective wherein the defect checking system only checks defective disk regions exceeding the threshold size; and a reverse reassign system for moving data previously reassigned from the region back to the region if the defect checking system has determined that the region is no longer defective, thus freeing the nondefective area for use.

40. A method for handling disk defects in a disk drive having a data storage disk formatted with a plurality of tracks, and a transducer positionable relative to the disk for reading and writing data thereon, comprising the steps of:

from information provided by the transducer, identifying a defective region of the disk in a first track and determining the size of the defective region;

if the defective region does not exceed a threshold size, reassigning any data previously written, or scheduled to be written, to the defective region to a substantially adjacent nondefective area of the first track; and if the defective region exceeds the threshold size, reassigning any data previously written, or scheduled to be written, to the defective region to a remote nondefective area outside the first track.

41. The method of claim 40, further comprising the step of maintaining a defect table for subsequent use in reading reassigned data.

42. The method of claim 41, wherein data is further subdivided into data sectors, and wherein the defect table includes an entry for each defective data sector.

43. The method of claim 40, further comprising the step of maintaining a first defect table for defective regions which do not exceed the threshold size, and maintaining a second defect table for defective regions exceeding the threshold size, both tables for subsequent use in reading or writing at the defective region.

44. The method of claim 43, wherein the data is further subdivided into data sectors, wherein the first table includes one entry for each reassigned defective sector, and wherein the second table includes one entry for each reassigned defective region.

45. The method of claim 40, wherein the step of reassigning defective regions which do not exceed the threshold size further comprises the steps of:

locating a nearest nondefective area in either direction from the defective region;

reading all data located between the defective region and the nondefective area into a data buffer;

rewriting the data previously written, or scheduled to be written, to the defective region and the buffered data to an area between the defective region and the nondefective area and including the nondefective area, such that the original sequence of the rewritten data is preserved.

46. The method of claim 45, further comprising the step of reconstructing any data previously written to the defective area.

47. The method of claim 45, further comprising the steps of:

detecting any read errors that occur when reading the data between the defective region and the nearest nondefective area, if a read error is detected, locating a next nearest nondefective area in the opposite direction from the nearest nondefective area, relative to the defective region, reading all data located between the defective region and the next-nearest nondefective area into the data buffer, rewriting the data previously written, or scheduled to be written, to defective region and the buffered data to an area between the defective region and the next-nearest nondefective area and including the nondefective area, such that the sequence of the reassigned data is preserved.

48. The method of claim 40, wherein the sequence of the data to be reassigned by the first data reassign system is preserved relative to adjacent data.

49. The method of claim 40, wherein nondefective areas used to reassign defects which exceed the threshold size are located in an area of the disk reserved for use by the disk drive.

50. The method of claim 40, wherein the threshold size is one data sector.

51. The method of claim 40, further comprising, a defect checking system which reads a region of the disk previously identified as defective and reassigned by one of the first and second reassign systems to determine if the region is still defective; and a reverse reassign system for moving data previously reassigned from the region back to the region if the defect checking system has determined that the region is no longer defective, thus freeing the nondefective area for use.

52. The method of claim 51, wherein defective regions are checked during an initialization sequence of the disk drive or during periods when the disk drive is not performing normal reading or writing operations.

53. The method of claim 51, wherein the defect detection system maintains at least one defect table having an entry for each defective region identified for use in subsequent reading of reassigned data, and wherein if a defective region has been determined to no longer be defective, the entry corresponding to that defective region is removed from the table entry.

54. The method of claim 53, wherein defects are checked at predetermined times by sequentially checking the defective regions entered in the defect table.

55. The method of claim 51, wherein the first reassign system maintains a first defect table having an entry for each defective region not exceeding the threshold size, and wherein the second reassign system maintains a second defect table having an entry for each defective region exceeding the threshold size, both tables for use in subsequent reading of reassigned data, and wherein if a defective region has been determined to no longer be defective, the entry corresponding to that defective region is removed from the table entry.

56. The method of claim 51, wherein the checking system checks each defective region a fixed number of times, thereafter designating the defective region irreversible.

57. The method of claim 40, wherein the data storage disk comprises a plurality of servo sectors, and wherein the identified defective region comprises a data region following an unreadable servo sector.

58. A method for handling disk defects in a disk drive having a data storage disk formatted with a plurality of tracks, and a transducer positionable relative to the disk for reading and writing data thereon, comprising the steps of:

from information provided by the transducer, identifying a defective region of the disk in a first track and determining the size of the defective region;

if the defective region does not exceed a threshold size, reassigning any data previously written, or scheduled to be written, to the defective region to a substantially adjacent nondefective area of the first track; and if the defective region exceeds the threshold size reassigning any data previously written, or scheduled to be written, to the defective region to a remote nondefective area outside the first track;

a defect checking system which reads a region of the disk previously identified as defective and reassigned by one of the first and second reassign systems to determine if the region is still defective wherein the defect checking system only checks defective disk regions exceeding the threshold size; and a reverse reassign system for moving data previously reassigned from the region back to the region if the defect checking system has determined that the region is no longer defective, thus freeing the nondefective area for use.

* * * * *